July 29, 1969
M. M. SEELOFF ET AL
3,457,834
WELD FLASH TRIMMER
Filed Nov. 25, 1966
3 Sheets-Sheet 1
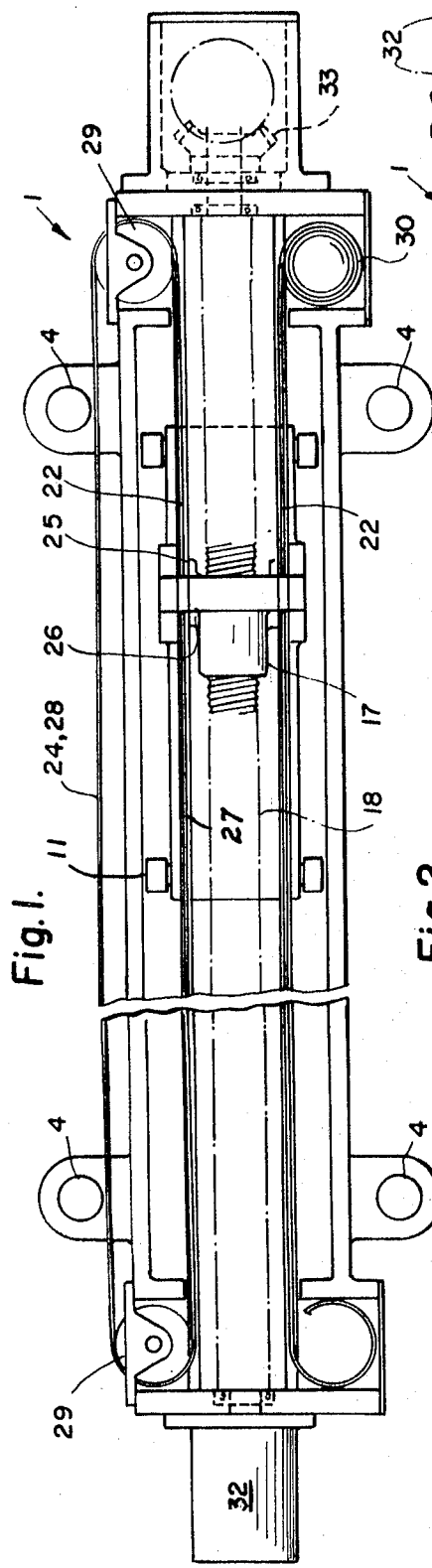
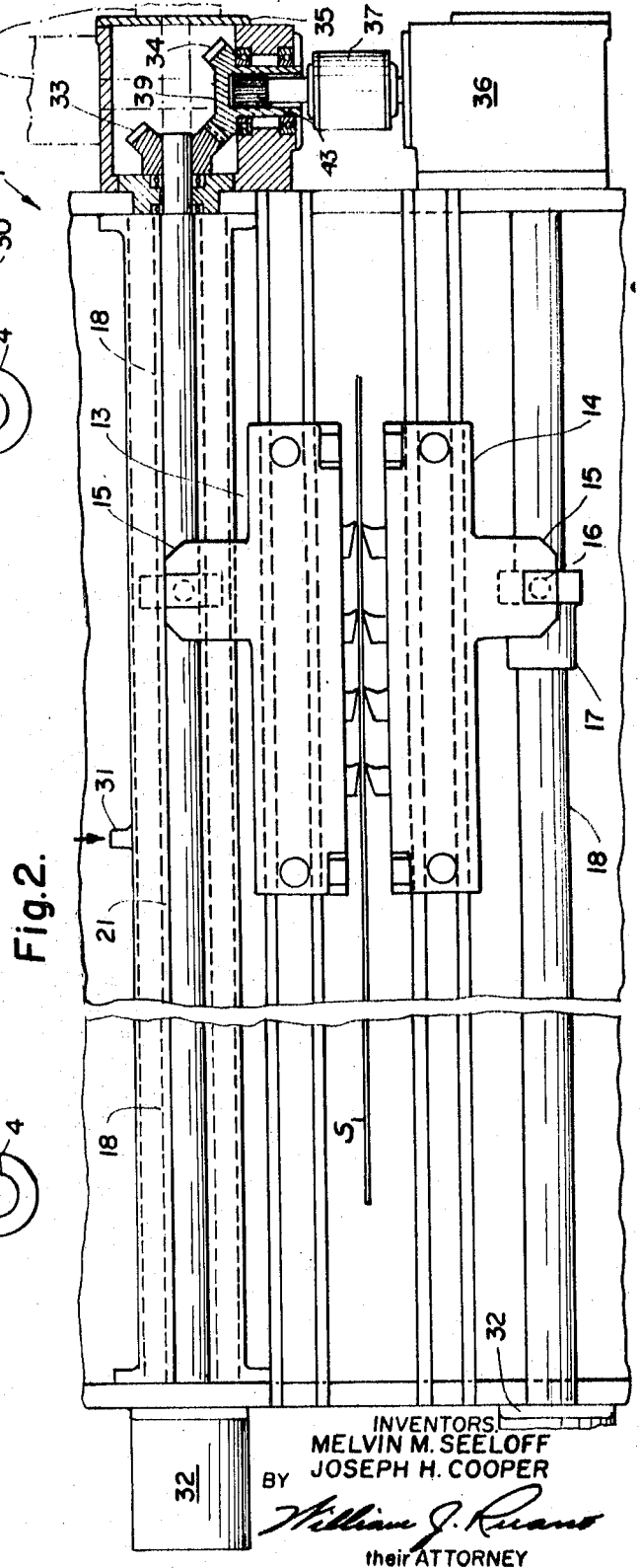
INVENTORS.
MELVIN M. SEELOFF
JOSEPH H. COOPER
BY
*William J. Ruano*
their ATTORNEY

United States Patent Office 3,457,834
Patented July 29, 1969

3,457,834
WELD FLASH TRIMMER
Melvin M. Seeloff and Joseph H. Cooper, Warren, Ohio, assignors to The Taylor-Winfield Corporation, Warren, Ohio
Filed Nov. 25, 1966, Ser. No. 597,102
Int. Cl. B23d 1/08, 1/00, 3/00
U.S. Cl. 90—42    11 Claims

ABSTRACT OF THE DISCLOSURE

A weld flash trimming machine having a pair of trimming tools simultaneously actuated by individual drive screws, and dust shields surrounding each of the drive screws.

---

This invention relates to a metal working machine and, more particularly, to a tool shaper or flash trimmer for removing excess metal simultaneously from both sides of a workpiece.

Shaper type flash trimmers in which the work is clamped between fixed pairs of spaced dies or clamps are well known in the art. However, different approaches have been made to the apparatus and method of pushing or pulling the cutting tools across the work to be trimmed.

An outstanding disadvantage of conventional flash trimmers is that the upper and lower cutting tools do not remain in alignment and assume an offset position longitudinally of the weld during cutting operation—that is, they do not move in unison as is absolutely necessary with trimmers for removing metal simultaneously from opposite sides of continuously moving strips or sheets welded end to end while travelling in a line, or of other workpieces.

One attempted solution has been to use short tool carriers and fasten both the upper and lower tool carriers to a pair of mechanically synchronized chains. However, due to chain stretch, complexity of the chain synchronizing mechanism, which must compensate for the separation of the work holding clamps, and the tendency to accumulate dirt in the drive mechanism, such devices have not been found to be wholly satisfactory. While it has the advantage of keeping the length of the machine relatively short from front to back, problems arise from abnormal machine width in cases wherein such width is of importance.

Another attempted solution was to incorporate a long tool holder carrier on the bottom of which is fastened a long rack of a length usually somewhat greater than the work to be trimmed, which rack is engaged by a driven gear pinion. The upper and lower tool carriers were synchronized by a guide pin and bushing, which pin was rigidly held in one tool holder and slid in a guide pin bushing held in the other of the two holders to permit separation after trimming. This design has the disadvantage of having long tool carriers, tool carrier ways and a long rack, all of which make the overall length of the machine at least 2½ times the length of the joint to be flash trimmed. The width of the machine also created problems in certain situations.

Hydraulically operated machines have also been devised wherein the motivating force is exerted by a long hydraulic cylinder. Here again, however, the long length of the cylinder and long length of the piston rod make the machine undesirable where length is a factor.

An object of our invention is to provide a novel multiple tool shaper or flash trimmer which overcomes the above-mentioned disadvantages and which is relatively simple and inexpensive in construction and yet highly efficient and reliable in operation.

A more specific object of our invention is to provide a multiple tool flash trimmer for removing excess metal simultaneously from opposite sides of a welded workpiece, such as continuously moving metal strips in a line which have been welded in end-to-end relationship, which trimmer is extremely compact by being short in length and narrow in width in order to fit into the small space allotted in flash welder-trimmer-notcher combination machines as shown in prior Patents Nos. 3,249,732 and 3,046,384 assigned to the present assignee, and which incorporates a multiple drive and synchronizing mechanism which assures continuous synchronization of the upper and lower tool holders as well as sharing of the work loads by the respective drive motors—also which permits easy and quick separation of said holders upon completion of the trimming operation.

Another specific object of our invention is to provide in the aforesaid flash trimmer, antifriction drives and novel enclosures therefor which prevent entry of dust and dirt into the drive mechanism and its deleterious effects.

Other objects and advantages will become more apparent from a study of the following description taken with the accompanying drawings wherein:

FIG. 1 is a top view of a shaper type flash trimmer embodying the principles of our invention;

FIG. 2 is a side view thereof with the remaining portions of the supporting framework shown broken away, and with one of the miter gear boxes shown in cross section;

Referring more particularly to the drawings, numeral 1 generally denotes a flash trimmer embodying the invention for removing flash or excess weld metal simultaneously from opposite sides of sheet metal strips or sheets S which have been welded in end-to-end relationship while traveling longitudinally in a galvanizing line or the like, that is, while strip or sheet S moves at right angles to the plane of FIG. 2.

Broadly stated, the present invention basically centers about the design of the tool holder carriers and their means of motivation and synchronization. Such means of motivation includes the use of a pair of antifriction ball screws driven by drive screws motivated by two separate hydraulic motors and including twin gear arrangements connected by a universal joint-splined shaft arrangement which allows separation of the clamps at the completion of the trimming operation. The drive screws are enclosed in housings into which air is introduced to keep outside dirt from collecting on such screws and antifriction ball screws.

Figure 3:
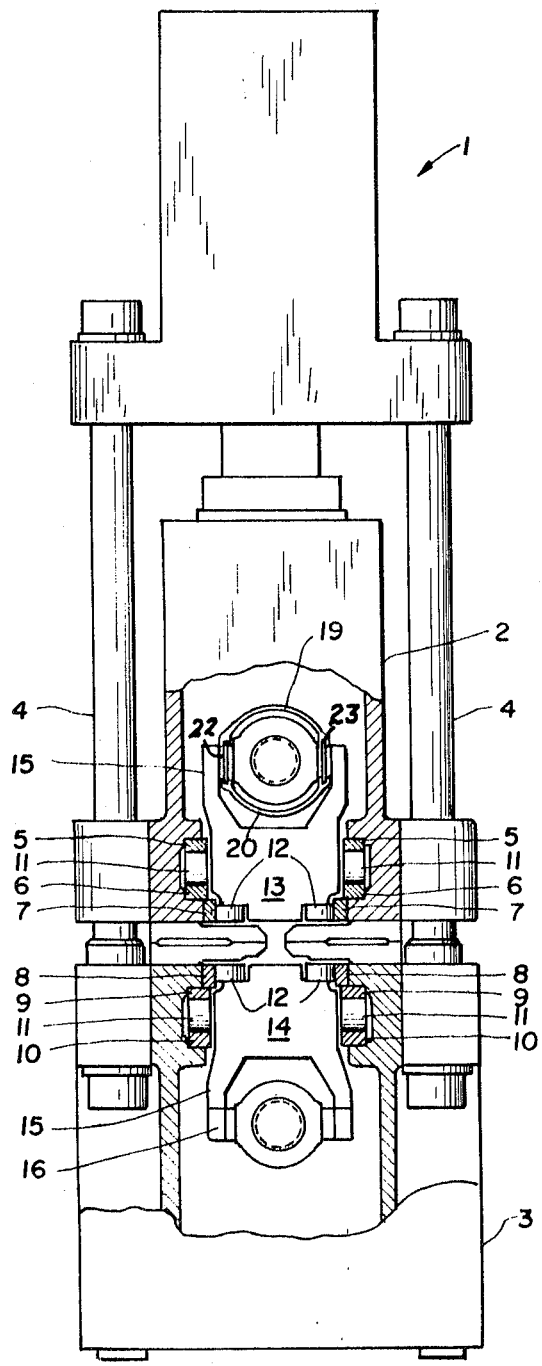
FIG. 3 is an end view thereof with portions shown broken away and in vertical cross section.

More specifically, and referring now to FIG. 3 of the drawing, numeral 1 generally denotes the upper stationary trimmer housing and numeral 2 denotes the movable clamp housing. The machine has a base and lower clamp housing 3, tie rods 4 and other allied equipment as shown also in the aforesaid prior patents assigned to the present assignee.

Hardened and ground plates 5, 6, 7, 8, 9 and 10 are rigidly mounted in the clamp housing 2 and the base 3. On these plates or between them roll the close fit antifriction rollers 11 and 12 which are rigidly mounted in the upper and lower tool holder carriers 13 and 14, respectively. This antifriction feature is necessitated by the fact that by adopting the ball screw drive, which is necessarily offset from the cutting edges of the multiple cutting tools, more load and consequently more friction is placed in the tool holder ways of the machine. To overcome this friction and consequent wear problem the tool holder carriers are mounted on the antifriction rollers.

Figure 4:
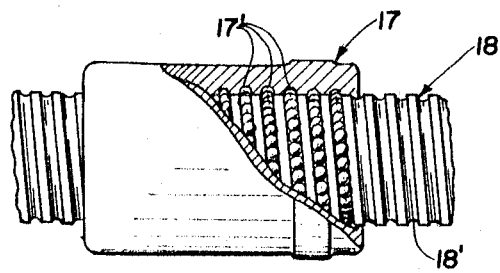
FIG. 4 is an enlarged view, partly in section, of part 17.

Raised, yoke-like portions 15 of the tool holder carriers 13 and 14 envelop on three sides, squared driving pins 16 which have a journal turned on their ends which slidably fit into the opposite ends of the flanges of ball screw nuts 17 (FIG. 4) which are propelled along the ball drive screws 18. Said square driving pins are held in position by keeper plates or set screws (not shown). By the removal of the square drive pins, the upper and lower tool carriers 13 and 14 are totally disconnected from the drive screws 18 so that said carriers can be readily and easily removed from the machine proper without the removal of the drive screws themselves.

The twin drive screws 18 are of the antifriction ball type (17'). Conventional V thread, square thread, or Acme threaded screws are unsuitable because of their high rate of friction which would cause undesirable heat and wear due to the necessary high revolutions per minute of these screws.

Because of the fact that all screws, regardless of type, are subject to malfunction and frictional galling if subject to dirt and dust particles, adequate means must be employed to prevent the inclusion of such dirt and dust particles. There are several ways of achieving such protection, such as the spirally wound telescoping type of metallic boot or the accordion pleated or bellows type of non-metallic boots. For short screw protection, these types of protection are satisfactory, but for long screws, such protective devices consume too much space for their adaption. They cause maintenance problems in that they are usually not dust-tight and the non-metallic type is quite perishable.

To overcome these difficulties, we have designed a novel way of protecting the ball type drive screws of our present invention, said ball screws being more susceptible to malfunction due to dirt than any of the conventional types. The protective means of our design is simple, rugged and maintenance free. Each screw is partially surrounded with rigid semi-tubular structures 19 and 20, said structures being spaced apart to form parallel grooves 23 within which the flatted projections on ball screw nuts 17 progressively travel. As stated earlier, the square drive pins 16, which engage the tool holder carriers 13 and 14, are journaled in these flatted projections. To keep the aforementioned grooves completely closed during the full travel of the carriers 13 and 14, there are provided sliding door type barriers 22 which slide in grooves 23 incorporated in the face or longitudinal edges of the semi-tubular structures 19 and 20.

The sliding barriers may be made in the form of an endless belt 24 (see FIG. 1) whose terminal ends are securely fastened to the flange of the ball screw nut 17 at points 25 and 26. The shielding side of the belt 22 as denoted by the numeral 27 lies in grooves 23 for their full length, thus effectively closing up completely the parallel grooves 23 in which the squared flange of the ball screw nut 17 travels. Numeral 28 denotes the return side of the belt. The endless belt rolls over pulleys 29 which are adjustable by well-known means (not shown) to provide a slight tension in the belt to prevent buckling and sagging.

A further modification for accomplishing practically the same results, would be to provide self-winding, spiral, concentrically wound flat springs 30 as the shielding medium. As one spring winds up, the complementary springs pays out, or vice versa, depending upon the direction of travel of the ball screw nut 17. While both modifications are shown in FIG. 1, it will be understood that normally, both of the side partitions will be of the first mentioned barrier type or the spring wound type 30.

Regardless of the type of screw protection used, fine particles of dust or dirt will filter through the sliding joints. To prevent such filtration inlet means 31 are provided for admitting a continuous supply of air at a very low pressure to the chambers that completely surround the drive screws. The air will then continuously leak through all the sliding joints from inside to outside, thus preventing any migration of dirt or dust toward the inside of the protecting tubular structure.

The twin ball screws are driven by means of hydraulic motors 32. Air or electric motors, however, could be used instead.

The motors can be mounted on the front of the machine and directly coupled to the screws as shown, or they can be mounted at the rear of the machine in the alternative positions as shown in dash and dot outline. By keeping the motors to the front of the machine, the overall length of the machine is kept at a minimum. There will also be fewer packing glands and bearings around the necessary shaft extensions, which packing glands are troublesome items.

The synchronizing of the drive screws 18, which in turn will keep the upper and lower carriers 13 and 14 and their cutting tools in alignment, is all important in order to obtain a smooth accurate cutting result. There are numerous ways of achieving this screw synchronization, all of which are either large space consumers, or costly and complex, especially those which employ the electric or hydraulic feedback systems which are difficult to maintain.

In accordance with the present invention, there is provided a very simple, rugged, compact, low cost, low maintenance way of achieving screw synchronization, keeping in mind that the screws separate during the work unclamping cycle. Because of the close center distance between drive screws when the machine is in the clamped position, and being that the upper clamp is free to float to the contour of the clamped sheet, a very compact, flexible synchronizing unit is required.

Twin hydraulic motors 32 drive the twin drive screws 18. These hydraulic motors also inherently act as brakes and cushions to stop the rotation of the screws at the completion of the machine cycle. They also have the advantage of preventing torque overload, due to malfunction, since the hydraulic pressure can be set to a safe preset value and spill over a conventional relief valve, should the machine malfunction.

Mounted and keyed to the end of each of the drive screws are antifriction bearing mounted bevel gears 33. Their mating bevel gears 34 are antifriction mounted in the upper bevel gear housing 35 and the lower bevel gear housing 36. Housing 35 is rigidly mounted on the upper movable clamp housing 2, while the lower gear housing 36 is rigidly mounted on the stationary machine base 3. As stated before, there is a relative separation movement between the two gear housings.

Figure 5:
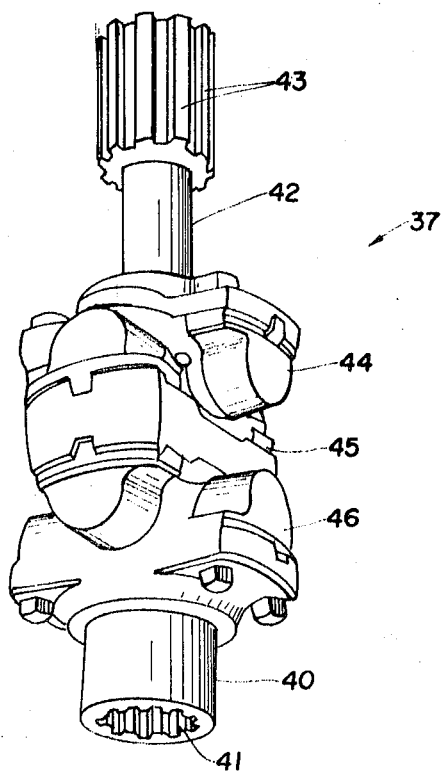
FIG. 5 is an enlarged perspective view of part 37.

Bevel gears 34 mounted in their separate housings are interconnected and synchronized by a known, automotive type flexible double universal joint 37 (FIG. 5). Each shaft end 42 and 41 of the universal joint is splined at 43 and 41, respectively, for driving and sliding purposes. Parts 44 and 46 are all in the same plane at right angles to part 45. The sliding means is to allow for the separation of the housings during the unclamping cycle when the tool holder carriers 13 and 14 are moved apart following completion of the trimming operation.

Because of the close center distance of the drive screws 18, when the machine is in the clamped position, a problem is getting room enough for the double universal joint interconnection. This is accomplished in the present invention by internally boring and splining the extended hub of bevel gears 34, thus allowing the universal joint shafts with their splined ends to extend into the gear boxes proper. The bored hole does not extend clear through the gear, thus a solid barrier 39 is left to retain the gear box oil.

It should be understood that a single motor, whether air, hydraulic, or electric, could be used to drive one screw which in turn would drive the second screw through the medium of the synchronizing mechanism. To do this it would be necessary that the screws and the synchronizing means be large enough to take the full load of the single motor should the machine malfuction. The synchronizing mechanism would be the driving means of the second screw.

In the dual drive of the present invention, each screw is driven by its own motor, with the synchronizing mechanism serving only the purpose of keeping the screws and hydraulic motors in mechanical synchronism. As outstanding advantage of such arrangement is that at no time would either of the screws or the synchronizing mechanism be subject to more load than could be exerted by only one of the two motors. The screws and the synchronizing mechanism, therefore, would be designed accordingly.

Thus it will be seen that we have provided an efficient multiple tool shaper or flash trimmer for effectively removing excess metal simultaneously from both sides of a workpiece and wherein a twin drive is provided, motivated by separate hydraulic motors so as to divide the work load, which drive includes antifriction ball means which is housed and pressurized to prevent or minimize entry of dirt and dust—also which twin drive is coupled to a unique double universal to insure synchronized movement of the knives, planishers or other trimming tools and to permit close spacing of the drive screws as well as easy and quick separation thereof when the tool holder carriers are moved apart following the trimming operation.

While we have illustrated and described several embodiments of our invention, it will be understood that these are by way of illustration only, and that various changes and modifications may be made within the contemplation of our invention and within the scope of the following claims.

We claim:

1. In a weld flash trimming machine, a pair of tool holder carriers supporting trimming tools which engage opposite sides of the workpiece for simultaneously removing excess weld metal therefrom, a pair of parallel disposed drive screws, rotary motor means for directly driving said drive screws so as to simultaneously move said holders for reciprocation movement, said rotary motor means being separate hydraulic motors directly coupled to said drive screws so as to divide the work load between said drive screws, and mechanical synchronizer means rotatably coupling said drive screws and keeping said drive screws and motors in synchronism and thereby keeping said trimming tools in alignment.

2. A flash trimming machine as recited in claim 1 wherein said mechanical synchronizer means comprises a universal joint.

3. A flash trimming machine as recited in claim 2 wherein said universal joint is a double universal joint interconnecting a pair of gear boxes coupled to said drive screws to keep them in synchronism.

4. A flash trimming machine as recited in claim 2, together with a pair of miter gears driven by one of said drive screws, and wherein said universal joint includes a splined shaft relatively slidable in a correspondingly splined well portion of the hub of one of said miter gears.

5. A flash trimming machine as recited in claim 1, together with a dust shield surrounding each of said drive screws, each dust shield comprising a pair of semi-cylindrical elements whose longitudinal edges are grooved and in spaced confronting relationship, and a pair of partitions, each slidably mounted between confronting grooves, and a ball screw nut driven by each of said drive screws and connected to the associated partitions for longitudinally moving said partitions relative to said drive screw.

6. A flash trimming machine as recited in claim 5, wherein said partitions are in the form of endless belts whose terminal ends are fastened to and travel with the associated ball screw nut, the opposite edges of said belts riding in said grooves so as to effectively seal said slots against admission of dirt.

7. A flash trimming machine as recited in claim 6, wherein said endless belts are of spring metal and one end of each belt is adapted to be wound into a coil while the other end is unwound from a coil.

8. A flash trimming machine as recited in claim 6, together with a source of air under pressure connected to the interior of said dust shields to prevent entry of dust and dirt particles from the outside atmosphere.

9. A flash trimming machine as recited in claim 6, together with a pair of squared drive pins connecting each tool holder carrier to its associated ball screw nut to enable easy removal of said carrier without disturbing said drive screws or dust guards.

10. A flash trimming machine as recited in claim 6, together with upper and lower clamp housings, and roller bearings for mounting said carriers for sliding movement along the interior confronting side surfaces of said housings.

11. A flash trimming machine as recited in claim 6, wherein said motors are mounted at the ends of said drive screws in front of said machine and wherein gear boxes are connected to the opposite ends of said drive screws and wherein said universal joint is connected between said gear boxes together with means for allowing said gear boxes to move apart as the result of separation of said carriers.

References Cited

UNITED STATES PATENTS

| 1,362,536 | 12/1920 | Lapointe | 90—97 |
| 2,781,698 | 2/1957 | Morton | 90—24.04 |
| 3,103,852 | 9/1963 | Bonnafe | 90—97 |
| 3,363,434 | 1/1968 | Kuhn et al. | 74—89.15 X |

ANDREW R. JUHASZ, Primary Examiner

G. WEIDENFELD, Assistant Examiner

U.S. Cl. X.R.

74—424.8; 90—24, 27